June 29, 1954    R. B. EVANS    2,682,315
GAS FILTER
Filed June 5, 1951

INVENTOR.
ROBERT B. EVANS
BY
Brown, Critchlow, Flick & Peckham
ATTORNEYS.

Patented June 29, 1954

2,682,315

UNITED STATES PATENT OFFICE 2,682,315

GAS FILTER

Robert B. Evans, Plum Township, Pa., assignor to Mine Safety Appliances Company, Pittsburgh, Pa., a corporation of Pennsylvania Application June 5, 1951, Serial No. 229,925

2 Claims. (Cl. 183—45)

This invention relates to gas filters, and more particularly to those adapted to be supported by a face-piece and containing a mass of filtering materials for filtering out noxious gases.

The filter disclosed herein is especially suitable for use with a face-piece such as shown in my co-pending patent application, Serial Number 219,274, filed April 4, 1951.

It is among the objects of this invention to provide a gas filter which has a simple and inexpensive construction, and which is filled with granules of filtering material that the gas can not channel past.

In accordance with this invention, an annular side wall is provided which is made of impervious resilient material. The side wall most suitably forms the lining of a case having an inlet at one end and an outlet at its opposite end. Extending across the inside of the case is a mass of filtering granules which engage the resilient lining. Perforated means in the case on opposite sides of the mass exert pressure on them to press the granules engaging the lining into it. This prevents gas channeling between the side of the mass and the lining.

Figure 1:
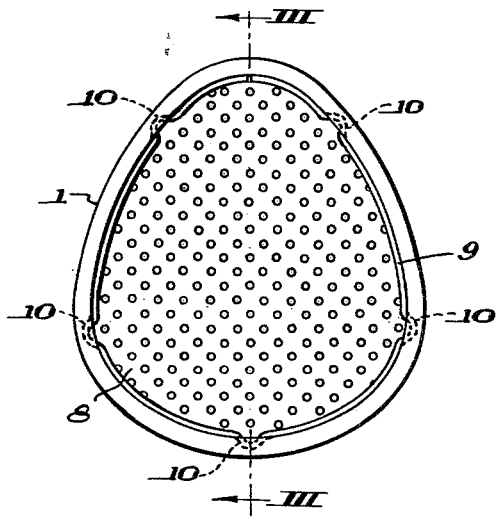
Figure 2:
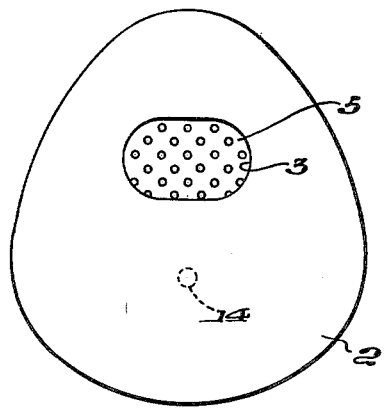
Figure 3:
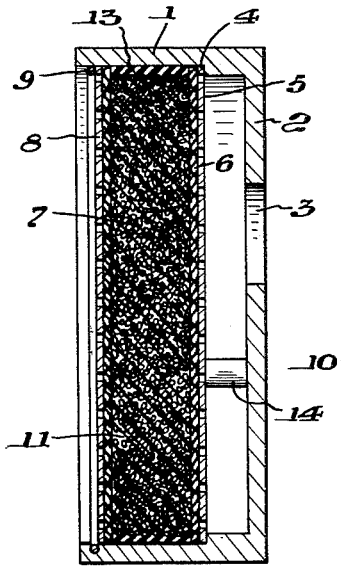
Figure 4:
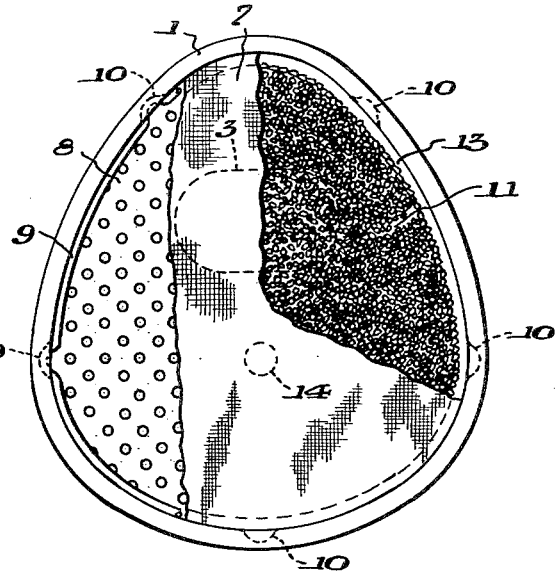

The preferred embodiment of the invention is illustrated in the accompanying drawings, in which Fig. 1 is a front or inlet end view of my filter; Fig. 2 is a rear view thereof; Fig. 3 is an enlarged vertical section taken on the line III—III of Fig. 1; and Fig. 4 is an enlarged front view of the filter with portions of it broken away to show different elements inside of it.

Referring to the drawings, the case has a side wall 1, at one end of which there is a back wall 2 provided with an outlet opening 3. This outlet also serves as a means by which the filter can be connected to the lower front portion of a face-piece in the manner shown in my co-pending patent application mentioned above. Inside the case a short distance from its back wall there is an annular shoulder 4 that faces forward. Seated against this shoulder is a perforated metal plate 5 which is thus spaced from the back wall of the case so that the back wall will not block the plate. The front face of this plate is covered by a sheet 6 of coarsely woven fabric. Near the front end of the lining there is another sheet 7 of coarsely woven material with a perforated metal plate 8 against its front surface. The plate is held in the case by means of a spring wire 9 which extends around the inside of the case and has outwardly bent portions that snap into shallow recesses 10 in the side wall of the case. The space that is surrounded by the rubber between the two pairs of pervious members is filled with a mass 11 of filtering material granules, such as charcoal or the like.

It is a feature of this invention that channeling of gas past the filtering mass, between the side of the mass and the side wall of the case, is prevented. This is accomplished by lining the side wall of the case between fabric sheets 6 and 7 with a strip 13 of impervious material which also is resilient, like rubber or a rubber-like material through which gas can not pass. This lining engages the inner surface of the case and forms a seat for the edges of the two fabric sheets. The filtering granules are packed so tightly in the space surrounded by the resilient lining, where they are held under pressure by the two perforated plates 5 and 8, that the granules which engage the lining are pressed outward into it. This causes the lining to fit part way around and between those granules so that gas will not be able to form channels between the mass of granules and the lining and thus by-pass the filtering material.

To keep the pressure on the filtering granules from bulging out the rear perforated plate 4, the central part of the plate may be backed up by a post 14 that extends from it back to the back wall of the case.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A gas filter comprising a case provided with a side wall and with an inlet and an outlet at its opposite ends, an impervious soft resilient lining for said wall, a mass of discrete filtering granules extending across the inside of the case and engaging said lining, and perforated means in the case engaging opposite sides of said mass, said granules being so tightly packed as to press the granules engaging the lining into it, whereby to prevent gas channeling between said mass and lining.

2. A gas filter comprising a rigid case provided with a side wall and with an inlet and an outlet at its opposite ends, an impervious soft resilient lining for said wall, a pair of axially spaced perforated plates mounted in the case, and a mass of discrete filtering granules filling the space between said plates and compressed tightly therein, whereby the granules engaging said lining are pressed into it to prevent gas channeling between said mass and lining.

References Cited in the file of this patent

UNITED STATES PATENTS

| Number | Name | Date |
| --- | --- | --- |
| 1,889,015 | Davis | Nov. 29, 1932 |
| 2,000,064 | Cover | May 7, 1935 |
| 2,035,097 | Schwartz | Mar. 24, 1936 |
| 2,062,834 | Schwartz | Dec. 1, 1936 |
| 2,116,537 | Miller | May 10, 1938 |
| 2,400,076 | Dauster | May 14, 1946 |
| 2,553,763 | Hammon | May 22, 1951 |
| 2,577,606 | Conley | Dec. 4, 1951 |